Sept. 25, 1962 S. MARKOWITZ 3,056,040

MAGNETIC CURRENT-STEERING SWITCH

Filed March 16, 1959

INVENTOR.
SEYMOUR MARKOWITZ

BY Lyon & Lyon

ATTORNEYS

United States Patent Office 3,056,040

Patented Sept. 25, 1962

3,056,040
MAGNETIC CURRENT-STEERING SWITCH

Seymour Markowitz, Los Angeles, Calif., assignor, by mesne assignments, to Ampex Corporation, Redwood City, Calif., a corporation of California Filed Mar. 16, 1959, Ser. No. 799,804
8 Claims. (Cl. 307—88)

This invention relates to electronic switching devices employing magnetic cores and, more particularly, to improvements therein.

One of the well-known devices for storage of information is the magnetic-core memory. This memory usually employs a plurality of magnetic cores, each of which has substantially rectangular hysteresis characteristics and, accordingly, two states of magnetic remanence. Information is therefore storable in binary fashion in each of the cores. In each magnetic-core memory, which consists of a plurality of cores, there is provided switching apparatus for the purpose of selecting a number of cores in the memory and driving those cores to one or the other of their states of magnetic remanence (P or N), whereby these cores represent the stored data by their conditions of remanence. The cores are subsequently driven back to an original, or initial, state of magnetic remanence for the purpose of reading out the stored information.

The magnetic-core memories may be driven from tubes, or transistors, or switch cores, which themselves are driven by tubes or transistors. A switch-core drive permits using combinatorial arrangements of the windings of a plurality of switch cores, whereby a reduction in the number of driving-current sources required may be achieved. Thereby, the expense of driving tubes and/or transistors may be saved.

It is an object of the present invention to provide a novel magnetic switch which can direct the current from driving-current sources into one of a plurality of paths.

It is another object of the present invention to provide a magnetic-core switch which eliminates the necessity for all but two accurate driving-current sources for driving a magnetic-core memory.

Yet another object of the present invention is a magnetic-core switch which reduces the cost of current-drive sources required for driving a selected one of a plurality of loads.

Still another object of the present invention is the provision of a novel and useful magnetic-core steering switch.

These and other objects of the invention are achieved in an arrangement wherein means are provided for selecting one of a plurality of switch cores and driving that switch core from its N condition of magnetic remanence towards its P condition of magnetic remanence. This induces a voltage in a winding upon the selected core, whereby a diode is unblocked to enable current to flow from a drive-current source through a load in series with the coil which has had the voltage induced therein. Upon removal of the drive current, a bias current is enabled to flow through a winding upon the selected core in a reverse direction to enable the selected core to be reset to its first condition of magnetic remanence.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2:
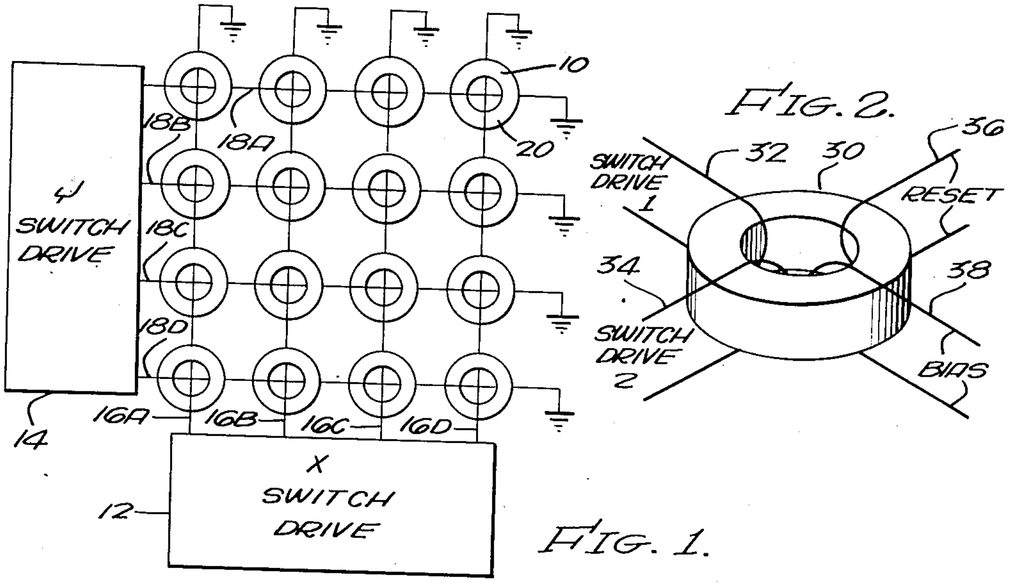
FIGURE 1 is a schematic diagram which exemplifies the typical application of the embodiment of the invention to a magnetic-core memory.
FIGURE 2 is a drawing of a core with windings thereon, shown to enable an understanding of the drawing symbols employed for the embodiment of the invention.

Referring now to FIGURE 1, there may be seen a schematic drawing of a very simple 4 x 4 magnetic-core memory matrix 10, which is driven by an X-switch drive 12 and a Y-switch drive 14. The cores in the memory matrix 10 are arranged in columns and rows. A separate column winding 16A, 16B, 16C, and 16D is inductively coupled to all the cores in the respective columns. A separate row winding 18A, 18B, 18C, 18D is inductively coupled to all the cores in the respective rows.

The cores 20 in the memory have two states of magnetic remanence—one which is designated as the N state, and the other as the P states. For purposes of illustration, let it be assumed that, when a core is in its N state, it represents binary zero storage, and, when a core is in its P state, it represents binary one storage. To drive the cores from one state to the other, a drive of half of the required amount is applied from a row winding and from a column winding to the desired core which is coupled to both of the excited row and column windings. The X-switch drive 12 and the Y-switch drive 14 serve the function of selecting one of the many row and column windings which intersect at a desired core and coincidently excite the selected row and column windings.

FIGURE 2 shows a single switch core 30 with the windings required in accordance with this invention. These are being shown as single-turn windings, in order to maintain simplicity in the drawings. Each core in a magnetic steering switch in accordance with this invention contains a first switch-driver winding 32 and a second switch-driver winding 34. There is also a reset winding 36 and a bias winding 38.

Figure 3:
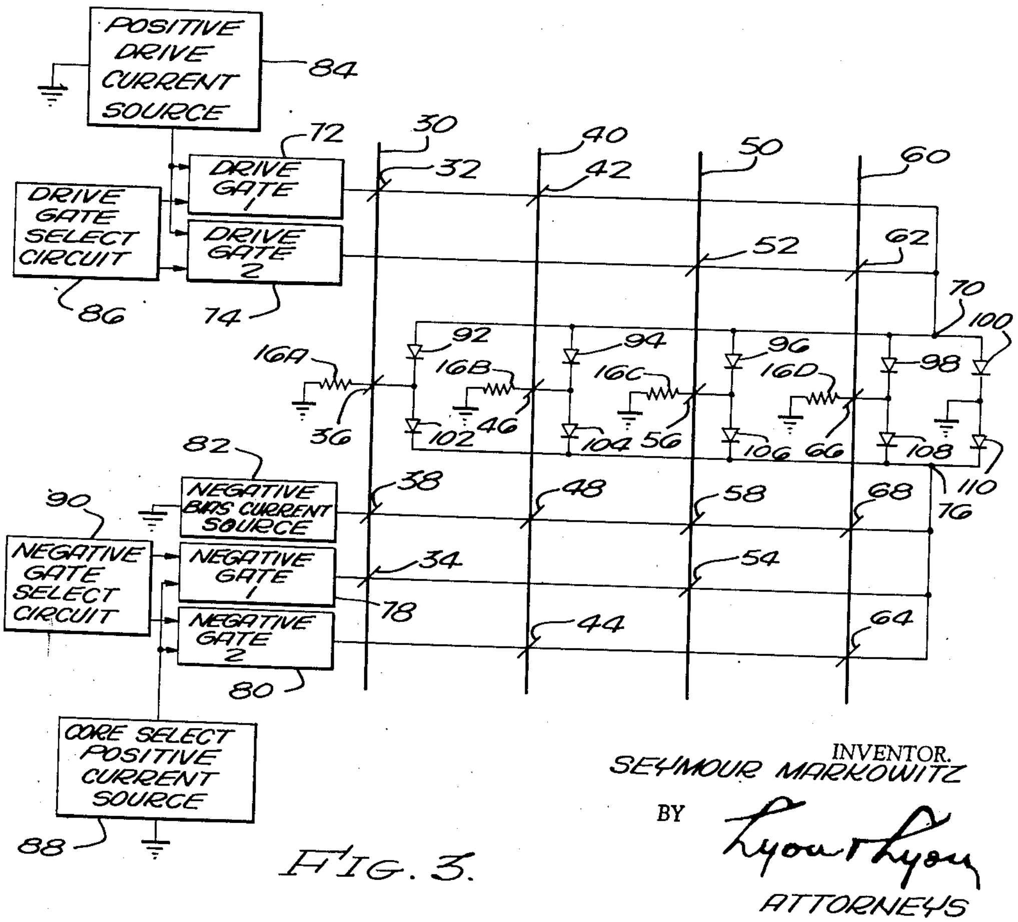
FIGURE 3 is a schematic drawing of an embodiment of the invention.

Reference is now made to FIGURE 3 of the drawings, which shows an embodiment of the invention. The switch core 30 is represented by the long vertical line. There are four vertical lines, and therefore four cores represented in FIGURE 3, respectively referenced as 30, 40, 50, and 60. Each winding on a core is represented as a line making an acute angle, with the vertical line representing the core. Thus, core 30 has the first and second switch-driver windings 32, 34, a reset winding 36, and a bias winding 38. Core 40 has the first and second switch-driver windings 42, 44, the reset winding 46, and bias winding 48. Similarly, cores 50 and 60 have a first and second switch-driver windings, respectively 52, 54, and 62, 64, reset windings, respectively 56, 66, and bias windings, respectively 58, 68.

The horizontal lines on the drawing which pass through the intersection of the winding representation and core indicate the serial connection of those windings with whatever apparatus in which the horizontal line terminates. Thus, the first switch-driver windings 32, 42 on the respective cores 30, 40 are connected in series and have one end of the series connection brought to a terminal 70. The other end of the series-connected first switch-driver windings are connected to a first drive gate 72. First switch-driver windings 52, 62 are also connected in series and have one end connected to the terminal 70 and the other end connected to a second drive gate 74. Second switch-driver windings 34 and 54 are connected in series and have one end connected to a terminal 76 and the other end connected to a first negative gate 78. Second switch-driver windings 44 and 64 are also connected in series and have one end of the series-connected windings brought to the terminal 76 and the other end of the windings connected to the second negative gate 80.

The bias windings 38, 48, 58, and 68 are all connected in series; one end of the series connection is brought to the terminal 76, and the other end of the series connection is connected to a negative-bias current source 82. A positive-drive current source 84 is connected to the first and second drive gates. However, these drive gates will not apply current therefrom until a second input is received from a drive-gate-select circuit 86. This circuit may be any well-known type of enabling circuit, such as a pair of flip-flop circuits. The negative gates 78 and 80 will not permit current to flow from a positive core-select current source 88 unless enabling input is received from a negative gate-select circuit 90. This negative gate-select circuit and the drive-gate-select circuit 86 may be identical types of circuits.

Terminal 70 has connected thereto the anodes of a plurality of diodes, respectively 92, 94, 96, 98 and 100. One of these diodes is associated with each core, and the last of these diodes is connected between the terminal 70 and ground, or reference-potential point, for all the current sources. An equal number of diodes 102, 104, 106, 108 and 110 have their cathodes connected to terminal 76. Each one of these diodes is associated with a different one of the cores, and the last of the diodes is connected to the same reference-potential point as the diode 100. The cathodes of the diodes 92, 94, 96, 98 are connected to one end of the reset winding on the associated core. The anodes of the diodes 102, 104, 106, and 108 are connected to the same end of the reset winding on the associated core. The other end of the reset winding is connected to a load, which has its other end connected to ground, or reference-potential point. This load is represented by a resistor in each case, and, in view of the example shown in FIGURE 1, this resistor will represent the load presented by the respective column windings 16A, 16B, 16C, and 16D. It should be appreciated that any type of load having a resistive component may be employed in place of a column winding.

During a quiescent, or nonselecting, interval current flows from the negative-bias current source 82 to ground, in parallel through all the loads 16A, 16B, 16C, 16D, through all the reset windings 36, 46, 56, 66, through all the diodes 102, 104, 106, 108, 110, through terminal 76, and then through all the bias windings 38, 48, 58, 68 back to the negative-bias current source. As a result of the low forward resistance of diode 110, most of the current flows therethrough and very little flows through diodes 102, 104, 106, and 108. For a small switch diodes 100 and 110 may be required to minimize the quiescent current through the loads. However, for large switches, on the order of a sixty-four way switch, then the division of current during the quiescent period causes such a low value of current to flow through each load as to eliminate the necessity for diodes 100, 110.

In order to select one of the column windings 16A, 16B, 16C, 16D and to apply drive current therethrough, the drive-gate-select circuit 86 and the negative gate-select circuit 90 are activated to open one of the gates to which they are connected to enable current to flow through a first and second switch-driver winding on a switch core associated with the load through which it is desired current to flow. For example, assume that it is desired to apply driving current through the winding 16B, this winding being associated with switch core 40. Thus, a first drive gate 72 and a second negative gate 80 are enabled by the respective drive-gate-select circuit and negative gate-select circuit. When this occurs, current will flow from the positive core-select current source 88 through the second negative gate, through the series-connected second switch-driver windings 44, 64, and through the series-connected bias windings 68, 58, 48, 38 back into the negative-bias current source 82. This results in cutting off negative-bias current flow through the diode 110. It should be noted that the number of winding turns of the bias and switch-driver windings are made the same.

As a result of the operation as described, the effect of the negative-bias current source on maintaining the cores 40 and 60 in their N state, or first state of magnetic remanence, is overcome. The cores, however, are not yet driven toward the P state. The drive-gate-select circuit 86 next enables drive gate 1 to permit current from the positive-drive current source 84 to flow through the first switch-driver windings 32, 42 on cores 30, 40. As a result, core 40 will be driven toward the P condition of magnetic remanence, and no other cores. As core 40 is being driven, a voltage is induced in its reset winding 46. This voltage has a polarity to render the cathode of the diode 94 more negative than its anode. As a result, the current from the positive-drive current source, instead of passing from terminal 70 through the diode 100 to ground, will pass through diode 94 through the reset winding and through the column coil 16B to ground. Thus, the operation of the switch is to steer the current from the drive-current source 84 through the load, which is coupled in series with the output winding on the core which has been driven toward its P condition. Current does not flow through any other diodes 92, 96, 98, since as far as these diodes are concerned the ground potential is more positive than their anode potential. Neither does current flow through diodes 102, 104, 106, 108, and 110, since the terminal 76 is effectively connected to the positive core-select current source 88 and is more positive than the ground potential.

The current flow through the first drive-switch drive winding 42 may be turned off before the core 40 has been driven as far as it can go. The voltage induced in the output winding 46 is thereby terminated, and also thereby the current drive through the column coil 16B. At that time, the current flowing through the first switch-driver windings 32, 42 will pass through the diode 100 to ground. The current from the positive-drive current source 84 can then be terminated by removing the enabling input to the first drive gate 72. Thereafter, the current from the positive core-select current source 88 is terminated by removing the enabling input to the negative gate 80. Such positive current termination, plus some negative bias current flow through the bias winding 48, starts core 40 returning to the state of remanence from which it was driven. This induces a voltage in output coil 46 which has a polarity which makes the anode of diode 104 more positive than its cathode whereby current flows from the negative bias source to ground through column coil 16B, output winding 46, diode 104 and then through terminal 76 back to the negative current source. The effect of steering the negative current through the output winding 46 results in driving core 40 back to its N state. When this has occurred the induced voltage is terminated and the path of the current from the negative current source is restored to its quiescent state.

It should be noted that the pattern of interconnection of the switch-driver winding is such as to enable the selection of the two switch-driver windings on any one core, whereby it may be driven for the purpose of steering the current from the positive-drive current source through the load associated with the core being driven. In the event it is desired to increase the size of the magnetic steering switch, the illustrated pattern of switch driver windings may be followed. For the greatest economy, if the number of cores in the switch is equal to the product MN, then M should equal the number of drive gates and N should equal the number of negative gates. There should be MN pairs of diodes. The winding interconnection pattern shown here is such that the first switch driver windings are connected together in multiples of two and brought out to the drive gates which provide positive-drive currents. The second switch-driver windings are also connected together, but in a pattern such that every other core has its second switch-driver winding connected to either the negative gate 78 or the negative gate 80.

There has accordingly been shown and described herein a novel, useful, magnetic steering switch which serves the function of steering the current from a current source through one of a plurality of loads. Selection of the load to which such current is applied is made by selecting one of a plurality of cores which is associated with that load.

I claim:

1. A magnetic switch for steering current from a load current source through a desired one of a plurality of loads said magnetic switch comprising a plurality of magnetic cores each having two states of magnetic remanence, means for continuously biasing all said cores to one of said states of magnetic remanence, a plurality of reset windings a different one of which is inductively coupled to a different one of said cores, a plurality of load means, means connecting one end of each reset winding to one end of a different one of said plurality of load means, direct load current means, means coupling the other ends of all said load means to said load current means, means for connecting the other ends of all said reset windings to said load current means including means for selectively driving a desired one of said cores toward the other of said states of magnetic remanence overcoming said means for continuously biasing during said drive to thereby induce a voltage in the associated reset winding, and means responsive to said induced voltage to enable current to flow from said direct-current load current means only through the reset winding and load means associated with said desired core.

2. A magnetic switch for steering current from a load current source through a desired one of a plurality of loads, said magnetic switch comprising a plurality of magnetic cores each having two states of magnetic remanence, means for continuously biasing all said cores to one of said states of magnetic remanence, a plurality of reset windings a different one of which is inductively coupled to a different one of said cores, a plurality of load means, means connecting one end of each reset winding to one end of a different one of said plurality of load means, direct-current load current means, a plurality of unilateral impedances, a different one of said unilateral impedances being connected to the other end of a different one of said reset windings, and means for connecting all said unilateral impedances to said direct-current load current means including means for selectively driving a desired one of said cores toward the other of said states of magnetic remanence overcoming said means for continuously biasing during said drive to thereby induce a voltage in the associated reset winding to enable current to flow from said direct-current load current means through the unilateral impedance reset winding and load associated with said driven core.

3. A magnetic switch as recited in claim 2 wherein said means for selectively driving a desired one of said cores toward the other of said states of magnetic remanence includes a drive winding inductively coupled to each of said cores, and means for selectively applying current from said direct-current load current means to the drive winding on the desired one of said cores.

4. A magnetic switch for steering current from a load as recited in claim 2 wherein said means for continuously biasing all said cores to one of said states of magnetic remanence includes a plurality of bias windings, a different one of said bias windings being inductively coupled to a different one of said plurality of cores, means connecting all said bias windings in series, a source of bias current, and means to apply current from said source of bias current to said series-connected bias windings to bias all said cores to said one state of magnetic remanence.

5. A magnetic switch for steering current from a load current source through a desired one of a plurality of loads, said magnetic switch comprising a plurality of magnetic cores each having two states of magnetic remanence, a plurality of bias windings, a different one of said bias windings being inductively coupled to a different one of said plurality of cores, means connecting all said bias windings in series, a source of bias current, means to apply current from said source of bias current to said series-connected bias windings to bias all said cores to said one state of magnetic remanence, a plurality of reset windings a different one of which is inductively coupled to a different one of said cores, a plurality of load means, means connecting one end of each reset winding to a different one of said plurality of load means, a plurality of diodes a different one of which has one end coupled to the other end of a different reset winding, direct-current load current means, and means for coupling the other ends of all said diodes to said direct-current load current means including means for driving a desired one of said cores toward said other state of magnetic remanence whereby a voltage is induced in the reset winding associated with said desired core to thereby steer current from said direct-current load current means through the diode, reset winding and load associated with said desired one of said cores.

6. A magnetic switch as recited in claim 5 wherein said means for driving said desired one of said cores toward said other state of magnetic remanence includes a separate drive winding inductively coupled to each core, means coupling said separate drive windings to the end of said series-connected bias windings to which said bias current source is not connected, and means to apply current from said direct-current load current means to the drive winding on said desired core to overcome the bias applied to said desired core.

7. A magnetic switch for steering current from a load current source through a desired one of a plurality of loads, said magnetic switch comprising a plurality of magnetic cores each having two states of magnetic remanence, a plurality of bias windings, a different one of said bias windings being inductively coupled to a different one of said plurality of cores, means connecting all said bias windings in series, a source of bias current, means to apply current from said source of bias current to said series-connected bias windings to bias all said cores to said one state of magnetic remanence, a plurality of reset windings a different one of which is inductively coupled to a different one of said cores, a plurality of load means, means connecting one end of each reset winding to a different one of said plurality of load means, a plurality of first diodes a different one of which has one end coupled to the other end of a different reset winding, means for coupling the other ends of said first diodes to one end of said series connected bias windings, load current means, a plurality of second diodes a different one of which has one end coupled to the other end of a different reset winding, means for coupling the other ends of all said second diodes to said load current means, means for driving a desired one of said cores toward said other state of magnetic remanence whereby a voltage is induced in the reset winding associated with said desired core to thereby steer current from said load current means through the second diode, reset winding and load means associated with said desired one of said cores, and means to render said means for driving inoperative whereby a voltage is induced in the reset winding associated with said desired core to thereby steer current from said source of bias current through the load means, reset winding and first diode associated with said desired one of said cores to restore it to its initial state of remanence.

8. A magnetic-core switch for steering current into one of a plurality of loads comprising a plurality of pairs of magnetic cores, each core having two polarities of magnetic remanence, each being capable of being driven from magnetic remanence at one polarity to magnetic remanence at the opposite polarity, each core having four separate windings thereon, a first and second of these being drive windings, a third being a bias winding, and a fourth being a reset winding, a first and a second source of positive current, a source of negative current, a point of reference potential for all said current sources, a first and a second diode associated with each of said magnetic cores each having an anode and cathode, a core, a plurality of load means, means connecting a different one of said plurality of load means between said point of reference potential and a different one of the reset windings to thereby associate a load means with a core, means connecting the other end of a reset winding to a first diode cathode and to a second diode anode of the first and second diodes associated with the core on which the reset winding is wound, a first terminal to which all said first diode anodes are connected, a second terminal to which all said second diode cathodes are connected, means connecting all said bias windings in series, means connecting said series-connected bias windings between said negative current source and said second terminal, means connecting the first drive winding of each pair of cores in series, means connecting one end of all said series first drive windings to said first terminal, means connecting in a first series the second drive windings of one core in each said pairs of cores, means connecting in a second series the second drive windings of the remaining core in each said pairs of cores, means connecting one end of said first and second series to said second terminal, means for selectively connecting said first positive current source potential to a desired series-connected pair of first drive windings, means to selectively connect said second positive current source to a desired one of said first and second series of second drive windings to drive the one of said cores having excitation applied to its first and second drive windings toward saturation at said opposite state of magnetic remanence to thereby cause current to flow through the first diode, reset winding and load means associated with the driven one of said cores, and means to disconnect said first and second current sources from said first and second drive windings to thereby cause current to flow from said negative current source through said load means, reset winding and second diode associated with the driven one of said cores to return said driven core to its initial state of magnetic remanence.

References Cited in the file of this patent

UNITED STATES PATENTS

| | | |
|---|---|---|
| 2,695,993 | Haynes | Nov. 30, 1954 |
| 2,719,961 | Karnaugh | Oct. 4, 1955 |
| 2,729,807 | Paivinen | Jan. 3, 1956 |
| 2,800,596 | Bolie | July 23, 1957 |
| 2,846,671 | Yetter | Aug. 5, 1958 |